United States Patent [19]

Aoki et al.

[11] Patent Number: 4,789,494

[45] Date of Patent: Dec. 6, 1988

[54] HYDROTHERMAL PROCESS FOR PRODUCING MAGNETOPLUMBITIC FERRITE

[75] Inventors: Katsuo Aoki; Toshio Ueda, both of Okayama, Japan

[73] Assignee: Dowa Mining Co., Ltd., Tokyo, Japan

[21] Appl. No.: 5,390

[22] Filed: Jan. 9, 1987

Related U.S. Application Data

[63] Continuation-in-part of Ser. No. 743,168, Jun. 10, 1985, abandoned.

[30] Foreign Application Priority Data

Jul. 31, 1984 [JP] Japan ................................. 59-161410

[51] Int. Cl.$^4$ ....................... C04B 35/26; C01G 49/08; C01G 49/06
[52] U.S. Cl. .............................. 252/62.59; 252/62.56; 252/62.6; 252/62.62; 252/62.63; 252/62.64
[58] Field of Search ................. 252/62.63, 62.59, 62.6, 252/62.62, 62.64, 62.56, 62.58

[56] References Cited

U.S. PATENT DOCUMENTS

| | | | |
|---|---|---|---|
| 3,072,575 | 1/1963 | Gorter et al. | 252/62.59 |
| 4,311,684 | 1/1982 | Umeki | 252/62.59 |
| 4,321,302 | 3/1982 | Umeki et al. | 252/62.59 |
| 4,323,464 | 4/1982 | Umeki | 252/62.59 |
| 4,407,721 | 10/1983 | Koike et al. | 252/62.63 |
| 4,425,250 | 1/1984 | Hibst | 252/62.59 |

*Primary Examiner*—Curtis R. Davis
*Assistant Examiner*—Chung K. Pak
*Attorney, Agent, or Firm*—Frishauf, Holtz, Goodman & Woodward

[57] ABSTRACT

There is disclosed in hydrothermal process for producing a magnetoplumbitic ferrite powder of the formula:

$$MO.n(Fe_{2-x}M'_xO_3) \qquad (1)$$

wherein M is one or more metals selected from the group consisting of Ba, Sr, Ca and Pb; n is a number of 3 to 6; M' is at least one component selected from the group consisting of Si, Ta, Sb, Nb, Zr and Ti, or a combination of that component with at least one other component selected from the group consisting of Ni, Co, Cu, Mg, Mn and Zn; x is a number of 0.01 to 0.7, which process comprises carrying out the reaction of said ferrite powder formation in a H$_2$O medium at a temperature higher than 100° C. and in the presence of an alkali having an alkali equivalent ratio greater than 1.0 with respect to an acid residue or in the presence of an alkali that provides the reaction system with a pH of 11 or more, said reaction being caused to proceed in the presence of "agent A" or in the present of both "agent A" and "agent B".

8 Claims, 1 Drawing Sheet

HYDROTHERMAL PROCESS FOR PRODUCING MAGNETOPLUMBITIC FERRITE

This application is a continuation-in-part, of application Ser. No. 743,168, filed June 10, 1985 now abandoned.

BACKGROUND OF THE INVENTION

The present invention relates to an improved hydrothermal process for producing a magnetoplumbitic ferrite powder that can be advantageously used as a magnetic material for high-density recording.

Conventional magnetic recording depends on magnetization which is induced within, and parallel to, the plane of a recording medium. This system is not particularly suitable for high-density recording since its recording density is limited by the demagnetizing field which increases as the degree of recording density in the medium increases. An alternative recording method which is generally referred to as "perpendicular magnetization recording" has been proposed and active efforts are being made towards commercializing this new method.

According to the perpendicular magnetization recording method wherein magnetization is induced in a direction perpendicular to the surface of the recording layer, any two adjacent microscopic magnets in the medium have dissimilar poles at the interface, and this causes a smaller demagnetizing field and ensures the retention of a larger remanence. At shorter wavelengths, a stronger magnetization is induced since the demagnetizing field is reduced and adjacent magnets having opposite mating poles attract each other. Because of these features, the perpendicular magnetization recording system is inherently adapted to high-density recording.

The medium used in the perpendicular magnetization recording system must have an axis of easy magnetization that is oriented in a direction perpendicular to the surface of the medium, and a sputtered Co-Cr film has been proposed for use as such medium. However, this Co-Cr film involves complicated procedures in its fabrication and is not cost effective because of the need to use expensive materials.

A coated type recording medium which is prepared by applying a powder of magnetoplumbitic ferrite powder to a base film is gaining acceptance as an alternative to the sputtered Co-Cr film and considerable effort is being made to commercialize this type of recording medium. There are several advantages inherent in the new recording medium wherein a powder of magnetoplumbitic ferrite powder is coated onto a base film: first, the technique of coating a magnetic layer onto a base film has been practiced for many years in the manufacture of other types of magnetic recording medium and the accumulated experience can be readily applied to the manufacture of perpendicular magnetization recording media; secondly, the existing manufacturing facilities can be used so as to avoid any need to make a large initial investment; thirdly, the coating technique is more efficient than sputtering and enables the economic production of recording media.

The powder of magnetoplumbitic ferrite, for example, Ba-ferrite, comprises particles in a hexagonal tabular form which have an axis of easy magnetization in a direction perpendicular to the plate surface. Therefore, when a slurry of this powder is coated onto a base film, the individual particles are easily oriented parallel to the surface of the base film, providing monoaxial anisotropy in a direction perpendicular to the coated surface. Because of these features, the Ba-ferrite powder is advantageously used as a magnetic material for perpendicular magnetization recording. Also advantageous are powders of magnetoplumbitic Sr-ferrite, Pb-ferrite, Ca-ferrite and combinations thereof.

However, magnetoplumbitic ferrite powders cannot be actually used as magnetic materials for perpendicular magnetization recording unless they satisfy several requirements at the same time. First, the saturation magnetization must be as high as possible; for example, Ba-ferrite should have a degree of saturation magnetization that is as close as possible to its theoretical 72 emu/g. Secondly, the coercive force should be reduced such as to be in the range of 200–2,000 Oe. The crystals of magnetoplumbitic ferrites have a large amount of anisotropy and possess high coercive forces which frequently exceed about 3,000 Oe. However, such high levels of coercive force saturate the head and render high-density recording difficult to achieve. Thirdly, the grain size should be in the range of 0.01 to 0.5 $\mu$m in order to ensure effective recording and playback at short wavelengths ($\leq$1.0 $\mu$m) which are typically used in high-density perpendicular magnetization recording. Fourthly, the grains should be in a thin tabular form and their tabularity ratio (breadth/thickness) is preferably at least 3. In addition to these requirements, a paint having the ferrite particles dispersed uniformly therein is essential for preparing a good recording medium and in order to attain this object, highly dispersible ferrite particles having no sintered or agglomerated grains are necessary.

As is well known, magnetoplumbitic ferrite powders can be produced by either the dry method or the hydrothermal method. They have their own merits and demerits and none of the techniques proposed so far are capable of producing ferrite powders that satisfy all of the requirements listed above.

Japanese Unexamined Published Patent Application No. 125219/1981 discloses producing a magnetoplumbitic ferrite powder for use in perpendicular magnetization recording by the dry method. Japanese Unexamined Published Patent Application Nos. 149328/1981 and 160328/1981 show the use of the hydrothermal method in producing the same magnetoplumbitic ferrite powder.

Stated more specifically, the process shown in Japanese Unexamined Published Patent Application No. 125219/1981 comprises the following steps: mixing predetermined proportions of the basic components of the intended magnetoplumbitic ferrite powder, a component to reduce the coercive force and a glass former; melting the mixture; rapidly quenching the melt to form an amorphous material; subjecting said amorphous material to heat treatment so as to crystallize fine ferrite particles; then removing the glassy material so as to prepare a ferrite powder comprising particles of a size ranging from 0.01 to 0.3 $\mu$m and having a coercive force of 200 to 2,000 Oe. This method is quite complicated and unsuitable for use in industrial applications. Furthermore, the expected difficulty in completely removing the glassy material would produce ferrite particles which are not highly dispersible and will cause agglomeration due to the presence of residual glassy material which functions as a binder between individual grains.

The hydrothermal method shown in Japanese Unexamined Published Patent Application No. 149328/1981 is more straightforward; a solution containing metal salts of Fe, Ba having a molar ratio of 1:12–3:12 with respect to Fe, and metallic elements other than Fe and Ba having an average ionic valence of 3 and which are present in molar ratios corresponding to 1.0:12–1.8:12 with respect to Fe is prepared, and after adding an alkali solution in an amount which is one to five times the equivalent weight of the sum of the metal salts, the mixture is subjected to hydrothermal reaction in an autoclaveaat 400° C. or higher. But in this method, which sees high temperature and pressure, sintered Ba-ferrite grains are frequently produced and the desired ferrite powder having good dispersibility is difficult to obtain. Another problem is caused by the fact that a ferrite powder having high saturation magnetization is usually difficult to prepare by autoclaving. In an actual embodiment of the cited process, a reaction was performed for 2 hours in an autoclave maintained at a temperature as high as 550° C., but the resulting Ba-ferrite powder had a saturation magnetization of only 47 emu/g. This value is even lower than 50 emu/g, which is the normal value for the conventional Ba-ferrite used in magnets. Therefore, according to the hydrothermal method shown in Japanese Unexamined Published Patent Application No. 149328/1981, even if the temperature and pressure in the autoclave are elevated to the highest possible values (the autoclave temperature of 550° C. causes an extraordinarily high pressure and cannot be realized without using a highly sophisticated autoclave), the resulting magnetoplumbitic ferrite powder has a saturation magnetization which is far smaller than the theoretical value.

Japanese Unexamined Published Patent Application No. 160328/1981 proposes a two-stage process which is designed to eliminate the disadvantages shown above. According to this process, a Ba-ferrite precursor having a very small saturation magnetization is first prepared by preventing the grain growth and the sintering or agglomeration of grains in an autoclave which is maintained.at low temperatures of 150°–250° C., and then the precursor is heated at 800° C. or higher so as to provide a Ba-ferrite powder having high saturation magnetization. However, even this process is unable to provide the Ba-ferrite powder with good dispersibility since the heating at 800° C. or higher unavoidably causes the sintering or agglomeration of individual grains.

As shown above, the production of magnetoplumbitic ferrite by the conventional dry process unavoidably involves the sintering or agglomeration of ferrite grains, and the sort of paint comprising a uniform dispersion of ferrite particles that is necessary for producing a coated type perpendicular magnetization recording medium adapted to high-density recording cannot be prepared. The dry process is also unable to produce tabular grains having a sufficient tabularity ratio to prepare a coated type perpendicular magnetization recording medium.

The hydrothermal process is capable of producing tabular ferrite grains with a high tabularity ratio but none of the conventional techniques of hydrothermal synthesis have succeeded in attaining the desired saturation magnetization. The Ba-ferrite powder prepared by the method shown in Japanese Unexamined Published Patent Application No. 149328/1981 has a saturation magnetization of 47 emu/g and this would be the highest of the values achieved by the previously reported hydrothermal techniques. This value is still lower than 72 emu/g which is the theoretically possible level for Ba-ferrite powder. In addition, the value of 47 emu/g can only be achieved with the autoclave temperature of 550° C. that calls for industrially unobtainable high temperature and pressures. Even such extreme autoclaving conditions are unable to provide a Be-ferrite powder having a near-theoretical value of saturation magnetization. As a further problem, the higher the temperature and pressure in the autoclave, the greater the possibility that sintered or agglomerated grains are produced. Such grains are not uniformly dispersed in a paint and fail to produce the desired coated type perpendicular magnetization recording medium. As shown in Japanese Unexamined Published Patent Application No. 160328/1981, if the practically feasible autoclaving temperature, for example, 400° C. or lower, is employed, only an incomplete magnetoplumbitic ferrite powder having low saturation magnetization results, and a completely satisfactory product cannot be obtained without supplementing the hydrothermal process with the dry method. But then, the dry method will again introduce the problem of sintered or agglomerated ferrite grains.

SUMMARY OF THE INVENTION

One object of the present invention, therefore, is to provide a hydrothermal process that is by itself capable of producing, at the ordinary autoclaving temperature, a complete magnetoplumbitic ferrite powder having such characteristics that will be suitable for use in the manufacture of a coated type perpendicular magnetization recording medium.

Another object of the present invention is to provide an improved hydrothermal process for producing a magnetoplumbitic ferrite powder that exhibits a high saturation magnetization unobtainable by the conventional hydrothermal process and which also has a properly reduced coercive force.

A further object of the present invention is to provide a hydrothermal process for producing a magnetoplumbitic ferrite powder that has good dispersibility and can be immediately used in the manufacture of a coated type perpendicular magnetization recording medium.

These objects of the present invention can be achieved by a hydrothermal process for producing a magnetoplumbitic ferrite of the formula:

$$MO.n(Fe_{2-x}M'_xO_3) \qquad (1)$$

(wherein M is one or more metals selected from the group consisting of Ba, Sr, Ca and Pb; n is a number of 3 to 6; M' is at least one component selected from the group consisting of Si, Ta, Sb, Nb, Zr and Ti, or a combination of that component with at least one other component selected from the group consisting of Ni, Co, Cu, Mg, Mn and Zn; x is a number of 0.01 to 0.7) in a $H_2O$ medium at a temperature higher than 100° C. and in the presence of an alkali having an alkali equivalent ratio greater than 1.0 with respect to an acid residue or in the presence of an alkali that provides the reaction system with a pH of 11 or more, wherein the reaction for the formation of said ferrite is caused to proceed in the presence of at least one organic compound (hereunder referred to as agent a) selected from the following group A.

The stated objects of the present invention can be attained more advantageously by combining said agent A either with at least one compound (hereunder agent B) selected from the following group B, or with at least one substance (hereunder agent C) selected from the following group C, or with both agents B and C.

(Group A) . . . alkylbenzenesufonic acids, salts thereof, or derivatives of such acids and salts; alkylsulfonic acids, salts thereof, or derivatives of such acids and salts; ligninsulfonic acids, salts thereof, or derivative of such acids and salts; naphthalenesulfonic acids, salts thereof, or derivatives of such acids and salts; amines, diamines, amides, quaternary ammonium salts, amine salts of acetic acid, or derivatives of such amine compounds; aliphatic acids, salts thereof, or derivatives of such acids and salts carboxylic acids, salts thereof, or derivatives of such acids and salts; lecithin or compounds analogous thereto; polyoxyethylene alkyl ethers or derivatives thereof; and sorbitan fatty acid esters or derivatives thereof.

(Group B) . . . alcohols or derivatives thereof; sugars, dextrin, glycols or derivatives thereof; and glycosides, ascorbic acid, oxycarboxylic acids, salts thereof, or derivatives of such compounds.

(Group C) . . . phosphoric acid, salts or compounds thereof; silicic acid, salts or compounds thereof; aluminum oxide, aluminum salts, or compounds thereof; and titanium oxide or compounds thereof.

DETAILED DESCRIPTION OF THE INVENTION

Formula (1) represents the composition of a magnetoplumbitic ferrite, and the present invention provides an improved process for producing a powdr of such magnetoplumbitic ferrite. In formula (1), the molar ratio n of (MO) to ($Fe_{2-x}M'_xO_3$), is within the range of 3 to 6. At molar ratios outside this range, compounds other than the intended magnetoplumbitic phase are produced. The amount x by which Fe is replaced by M' is within the range of 0.01 to 0.7. If x is smaller than 0.01, the intended coercive force is not obtainable, and if x is greater than 0.7, the saturation magnetization of 50 emu/g is not obtained even by the process of the present invention.

Magnetoplumbitic ferrites have principally been used as magnetic materials having high coercive force. In order to use them as materials for perpendicular magnetization recording, their coercive force must be reduced to certain levels suitable for perpendicular magnetization recording, and the so reduced coercive forces must be controlled to be within the proper range. J. Smith and H. P. J. Wijn reported in "Ferrites" (1959) a method of reducing the coercive force of a magnetoplumbitic ferrite by replacing part of the essential Fe atoms with another metal atom. The present inventors have found that in applying this theory to the hydrothermal process, the coercive force of the magnetoplumbitic ferrite according to the present invention can be reduced most effectively by replacing part of the Fe atoms in the ferrite lattice with M' which is at least one element selected from the group consisting of Si, Ta, Sb, Nb, Zr and Ti, or a combination of such element with at least one other component selected from the group consisting of Ni, Co, Cu, Mg, Mn and Zn. When the amount x by which Fe is replaced by M' is within the range of 0.01–0.7, the coercive force of the resulting magnetoplumbitic ferrite is controlled at a desired value between 200 and 2,000 Oe and at the same time, a saturation magnetization exceeding 50 emu/g is obtained.

Figure 1:
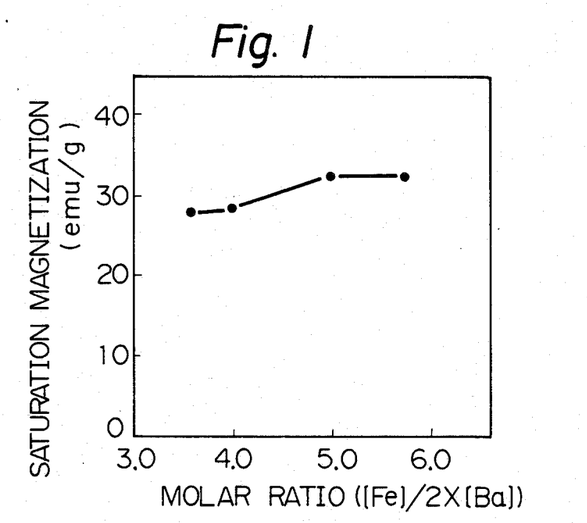
FIG. 1 shows the saturation magnetization of a Baferrite ($BaO.nFe_2O_3$) as a function of the molar ratio $n=(Fe)/2\times(Ba)$ used in its hydrothermal synthesis in the absence of the ferrite formation promoter specified by the present invention.

As already mentioned, the molar ratio n of (MO) to ($Fe_{2-x}M'_xO_3$) is held in the range of 3 to 6 in order to preclude the formation of compounds other than the intended magnetoplumbitic ferrite. But it should be noted that meeting this requirement alone is not sufficient for obtaining a high saturation magnetization in the ferrite produced by the hydrothermal method. FIG. 1 shows the results of preparing $BaO.5Fe_2O_3$ by the hydrothermal process without using agent A, B or C according to the present invention. The data in FIG. 1 were obtained by the following procedure: aqueous solutions containing $FeCl_3$ and $BaCl_2$ in such amounts that n was within the range that provided Ba ferrite having the formula $BaO.nFe_2O_3$; the alkali equivalent ratio of each aqueous solution was adjusted to 1.5 with aqueous NaOH (the alkali equivalent ratio is the ratio of the molar number of NaOH to that of Cl, or NaOH/Cl); the so treated aqueous solutions were subjected to hydrothermal synthesis in an autoclave maintained at 300° C. for 60 minutes. FIG. 1 shows the saturation magnetization of the resulting Ba ferrites as a function of the molar ratio n of $Fe/2\times Ba$. As is clear from FIG. 1, even if the molar ratio of Fe to Ba is adjusted to be within the range of 3 to 6 that provides a magnetoplumbitic ferrite, the saturation magnetization obtained is not more than about 32 emu/g. This value is not much different from the results shown in Japanese Unexamined Published Patent Application No. 149328/1981, and it can be seen that in the production of a magnetoplumbitic ferrite by the hydrothermal process, a satisfactorily high saturation magnetization cannot be obtained by simply controlling the composition of the starting mixture no matter how strict that control is. As will be shown later, this limitation can only be removed by using agent A, optionally together with agent B or C in accordance with the present invention.

The process of the present invention also requires that "the magnetoplumbitic ferrite of formula (1) be formed in a $H_2O$ medium at a temperature higher than 100° C. and in the presence of an alkali having an alkali equivalent ratio greater than 1.0 with respect to an acid residue or in the presence of an alkali that provides the reaction system with a pH of 11 or more". This requirement dictates that a starting mixture in water that has been adjusted to have the composition of formula (1) is subjected to ferrite forming reaction in the presence of the specified amount of an alkali at a temperature higher than 100° C. or within an autoclave (temperatures exceeding 100° C. are practically unobtainable unless an autoclave is used). The hydrothermal process refers to performing the reaction of ferrite synthesis in an autoclave using water as the reaction medium.

This hydrothermal process begins with the preparation of a starting mixture and that of an alkali. First, a uniform mixture of the predetermined proportions of the metallic components that provide the ferrite composition of formula (1) is prepared. The metallic components may be supplied from any starting material that is selected from among the respective metal halides and nitrate salts, other water-soluble metal salts, and the respective metal hydroxides. If all the starting materials are water-soluble metal salts, the starting mixture is an aqueous solution containing predetermined proportions of metal ions. If hydroxides are selected as the starting materials, the starting mixture is a slurry. If both water-soluble metal salts and hydroxides are used, the starting mixture is a slurry containing metal ions and metal hydroxides. Iron oxyhydroxide may also be used in the process of the present invention as an Fe source.

The starting mixture thus prepared is brought into contact with an alkali (an aqueous solution containing an alkali substance), and as a result of the contact, a precipitate usually forms to provide an alkaline slurry. The alkali is used in such an amount that te alkali equivalent ratio with respect to an acid residue exceeds 1.0. In the absence of an acid residue, the alkali is used in such an amount that the alkaline slurry obtained by contacting the starting mixture and the alkali solution has a pH of 11.0 or more. Whichever the case, the alkaline slurry contains either a metal hydroxide, or a metal hydroxide plus iron oxyhydroxide, or the combination of a metal hydroxide, iron oxyhydroxide and a metal ion. If the above stated requirements for the amount of the alkali are not met, a very small amount of the desired magnetoplumbitic ferrite results. The alkali solution to be used is selected from among solutions of NaOH, KOH, LiOH or $NH_4OH$, mixture of one or more of these solutions, and solutions containing other substances that show strong alkalinity.

Figure 2:
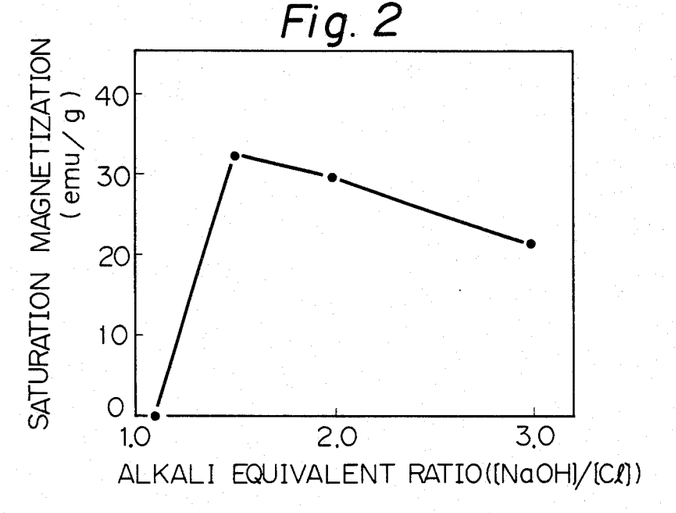
FIG. 2 shows the saturation magnetization of a ferrite as a function of the alkali equivalent ratio used in its hydrothermal synthesis in the absence of the ferrite formation promoter specified by the present invention.

It is to be noted that a magnetoplumbitic ferrite having the desired high saturation magnetization cannot be obtained by simply using the above specified amount of an alkali. That is clear from FIG. 2, which shows the saturation magnetization of Ba-ferrite as a function of the alkali equivalent ratio used in producing said ferrite by the hydrothermal process. The data in FIG. 2 were obtained by the following procedure: aqueous solutions containing $FeCl_3$ and $BaCl_2$ in predetermined amounts that provided a Ba-ferrite having the composition of $BaO.5Fe_2O_3$ were prepared; the alkali equivalent ratios (NaOH/Cl) of the solutions were varied by treatement with an aqueous NaOH; the so treated aqueous solutions were subjected to hydrothermal synthesis in an autoclave that was held at 300° C. for 60 minutes. The data in FIG. 2 clearly show that the desired high saturation magnetization cannot be obtained by simply controlling the alkali equivalent ratio of the starting mixture to be within the proper range. A properly controlled alkali equivalent ratio is an important factor for the purpose of producing a magnetoplumbitic ferrite by the hydrothermal method, but this factor alone is insufficient for obtaining a magnetoplumbitic ferrite having the desired high saturation magnetization. As will be shown later, this limitation can only be removed by using agent A, optionally in combination with agent B or C, in accordance with the present invention.

The starting mixture may be brought into contact with the alkali solution by any of the following methods: the alkali solution is added to the starting mixture; the starting mixture is added to the alkali solution; or the two are brought into contact with each other by supplying them simultaneously in small amounts. The treatment with the alkali solution may be carried out at any temperature not higher than 400° C. The treatment may therefore be performed within an autoclave held at a temperature not higher than 400° C. Needless to say, the starting mixture may be first treated with the alkali outside of an autoclave, and then charged into the autoclave for performing hydrothermal synthesis of the desired magnetoplumbitic ferrite.

As already mentioned, the hydrothermal synthesis of the magnetoplumbitic ferrite using an autoclave has inherent limitations with regard to its ability to produce a high saturation magnetization. In other words, a nearly perfect crystal of magnetoplumbitic ferrite cannot be produced by performing the hydrothermal process under practically feasible high temperatures and pressures even if the composition and alkali equivalent ratio of the starting mixture are adjusted to be within the proper ranges.

In order to remove this limitation, the present inventors made various studies on the method of accelerating the reaction for ferrite formation involved in the hydrothermal process. As a result, the inventors have found the surprising fact that the completely inorganic reaction for ferrite formation can be advantageously accelerated by incorporating an organic substance in the reaction system. It has also been found that this accelerating effect can be provided by an organic substance although the degree of acceleration varies from one organic compound to another. With a view to finding the most effective organic substances, the inventors have screened a great many compounds and located the substances of group A as particularly effective organic compounds. The inventors have also located the substances of group B and group C (the latter may be organic or inorganic) as substances which are not highly effective if used alone but which enhance the effects of the substances of group A when used in combination with substances of group B or C.

Specific examples of the substances of groups A, B and C are listed below.

(Group A) . . . alkylbenzenesulfonic acids such as dodecylbenzenesulfonic acid and hexadecylbenzenesulfuric acid, salts thereof, or derivatives of such acids and salts; alkylsulfonic acids such as dodecylsulfonic acid and hexadecylsulfonic acid, salts thereof, or derivatives of such acids and salts; sulfate salts such as sodium dodecylsulfate and sodium hexadecylsulfate; lignin sulfonic acid, salts thereof, or derivatives of such acid and salts; naphthalenesulfonic acid, salts thereof, or derivatives of such acid and salts; amine compounds such as dodecylamine, dicocoamine, dodecyldimethylamine, hexadimethyleneamine, stearyltrimethyl ammonium chloride and laurylamine acetate, or derivatives thereof; aliphatic acids such as butyric acid, lauric acid, stearic acid, oleic acid, linolic acid and linolenic acid, salts thereof, or derivatives of such acids and salts; carboxylic acids such as benzenetricarboxylic acid, tricarballylic acid and maleic acid, salts thereof, or derivatives of such acids and salts; lecithin or compounds analogous thereto; polyoxyethylene alkyl ethers such as polyoxyethylene oleyl ether, or derivatives thereof; sorbitan fatty acid esters such as sorbitan monooleate, or derivatives thereof.

(Group B) . . . alcohols, esters and derivatives thereof such as butyl alcohol, cetyl alcohol, glycerine, cholesterol, nitrate monoesters, glycerine aldehyde and benzoate esters; sugars such as monose, diose, maltose, sucrose, cellulose, starch, glycogen, dextran and alginic acid; dextrins such as limit dextrin and Schardinger dextrin; glycols such as ethylene glycol, propylene glycol and polyethylene glycol; glycosides such as β-methylglycoside and arbutin; oxycarboxylic acids such as ascorbic acid, tartaric acid and citric acids, salts thereof, or derivatives of such acids and salts.

(Group C) . . . phosphoric acids and phosphate salts such as phosphoric acid, sodium trimetaphosphate and sodium hexametaphosphate; silicon compounds such as colloidal silica, sodium silicate and aminopropyltrimethoxysilane; aluminum compounds such as alumina and sodium aluminate; and titanium comounds such as titanium dioxide and isopropyltriisostearyl titanate.

The above listed examples of agent A promote the reaction which leads to the formation of magnetoplumbitic ferrite by the hydrothermal process. By incorporating such substances in the reaction system, a magnetoplumbitic ferrite powder having a saturation magnetization of 50 emu/g or higher can be obtained at an autoclave temperature of 180°–400° C. The increased saturation magnetization means that the obtained ferrite is close to the ideal product and that, therefore, agent A has displayed the effect of accelrating the reaction for the formation of such a near-ideal magnetoplumbitic ferrite. The lower limit for the amount of agent A capable of providing this accelerating effect is about 1 wt % of the ferrite product although the exact amount varies with the type of agent. The present inventors have confirmed that the upper limit for agent A to exhibit its intended effect is 70 wt % of the ferrite product. Using more than 70 wt % of the ferrite of agent A causes some difficulty in its handling, and its accelerating effect is saturated. Therefore, agent A is used in an amount ranging from 1 to 70 wt %, preferably from 1 to 50 wt %, of the ferrite product.

The mechanism by which an organic substance such as agent A accelerates the inorganic reaction involved in the hydrothermal systhesis of ferrite has not been completely unravelled. The present inventors assume that agent A works as a carrier and provides a certain catalytic action in the reaction of ferrite formation.

Agent B, if it is used alone, has little or no ability to accelerate the ferrite formation. But if it is used in combination with agent A, the ferrite formation is more accelerated than when agent A is used independently. The effect of agent B in enhancing the activity of agent A is obtained if the former is used in an amount of at least 0.01 wt %, preferably at least 0.5 wt %, of the ferrite product. However, if agent B is used in a more than necessary amount, not only is its effect saturated but also its handling becomes difficult. Therefore, agent B is generally used in an amount of up to 10 wt %, preferably up to 5 wt %, of the ferrite product.

Agent C, which may be organic or inorganic, has no ability to accelerate the ferrite formation either if used independently. However, the objects of the present invention can be effectively achieved if agent C is used in combination with agent A, which may be optionally used together with agent B. No desired effect is obtainable even if the combination of agents B and C is used in the absence of agent A. The lower limit for the effective amount of agent C is 0.01 wt %, preferably 0.5 wt %, of the ferrite product, and the upper limit is about 5 wt %.

In the course of the screening test, the present inventors have found several organic substances which are not effective as agent A if they are used alone. To illustrate a few, gelatin, sodium citrate (this is effective as agent B) and gamma-aminopropyltrimethoxysilane are not effective, as will be shown in the Comparative Examples given later in this specification.

The effectiveness of agent A, agent A+agent B, agent A+agent C, or agent A+agent B+agent C is exhibited if these additives are present at any time during the period in which the hydrothermal reaction for producing the intended ferrite is performed in an autoclave. Therefore, these agents may be added during the step of preparing the starting mixture, the stage where the starting mixture is treated with an alkali, the stage where the reaction for ferrite formation is taking place, or any intervening step.

Said agents A, B and C which act to accelerate the ferrite formation are compounds of the type often identified as dispersants in other technologies. When said agent(s) is a salt, the salts are preferably the alkali metal salts, e.g. Na or K, and the ammonium salts.

The reaction for ferrite formation is performed in an autoclave at a temperature higher than 100° C., preferably between 180° and 400° C. Since the reaction medium is $H_2O$, temperatures higher than 100° C. in the autoclave will produce superatmospheric pressures. If the temperature in the autoclave exceeds 400° C., very high pressures will build up in the autoclave and present considerable difficulty in producing the desired ferrite on an industrial scale. A further problem is caused by the fact that under such extreme codditions, the reaction proceeds so rapidly that coarse, rather than fine, ferrite grains are produced. Therefore, in order to avoid not only extreme reaction conditions but also excessive grain growth, the temperature in the autoclave during the ferrite formation should preferably not exceed 400° C. With the temperature range of 100° C. to 400° C., higher temperatures are more effective in accelerating the ferrite formation. However, as will be shown later in Examples 1 to 16, the objects of the present invention are satisfactorily achieved by using temperatures between 250 and 300° C. At temperatures lower than 180° C., some additives will prove ineffective in producing magnetoplumbitic ferrite powders having the desired saturation magnetization. Therefore, in actual operations, the reaction temperature generally ranges from 180° to 400° C., preferably from 180° to 350° C., more preferably from 200° to 300° C. Satisfactory results are obtained if these temperatures and pressures are maintained over a period of 10 hours although the exact retention time depends on the reaction temperature used. In some cases, the objects of the present invention can be achieved by using a retention time of about 1 hour, and a shorter period may of course be used if other reaction conditions permit.

When the hydrothermal synthesis reaction in an autoclave is completed in accordance with the present invention, a slurry containing grains of magnetoplumbitic ferrite is obtained. This slurry shows high alkalinity and must be freed of any impurities by repeating filtration and washing steps. Subsequently, the residue is dried, followed by optional disintegration, to obtain the desired magnetoplumbitic ferrite powder.

Some of the substances included in Groups A, B and C are adsorbed, either by themselves or in the form of their modified products, on the surface of ferrite particles, and such adsorbed films improve greatly the separability of individual ferrite particles. As an attendant advantage, a magnetic paint wherein the ferrite particles are uniformly dispersed can be readily prepared. If such films are not necessary, they may be desorbed to produce film-less ferrite particles. The desorption of the unnecessary films may be simply carried out by heating (up to about 300° C.) in the air. The resulting ferrite particles also have good dispersibility.

As shown above, according to the present invention, (i) the molar ratio n in formula (1), the type of component M' as a substitute for Fe, as well as the amount of M' are limited to the specified ranges; (ii) the amount of the alkali with which the starting mixture is treated is also limited to be within the proper range specified above; and (iii) agent A, or the combination of agent A plus agent B, agent A plus agent C, or agent A+agent B+agent C is incorporated in the reaction system for ferrite formation. By combining these features, the present invention enables the production of a crystalline magnetoplumbitic ferrite powder by a hydrothermal technique, and the resulting ferrite product has a limited coercive force of 200–2,000 Oe and exhibits a saturation magnetization of at least 50 emu/g, which has been unobtainable by any of the prior art hydrothermal techniques. As already mentioned, agent A used alone, or agent B or C used in combination with agent A, has the ability to accelerate the reaction for the formation of the desired ferrite. Such agents are also believed to prove effective in preventing the sintering or agglomeration of individual ferrite particles. Therefore, the crystalline ferrite grains produced by the method of the present invention retain high dispersibility. They are in a very thin tabular form with axial diameters of 0.03–0.5 μm and average thicknesses of 0.01–0.03 μm. In short, the process of the present invention provides a magnetoplumbitic ferrite powder which has optimum characteristics for use in a perpendicular magnetization recording medium.

The advantages of the present invention will become more apparent by reading the following Examples, to which the scope of the invention is by no means limited.

EXAMPLE 1

A uniform mixture was prepared from 280 ml of aqueous $FeCl_3$ (3.1 moles), 162 ml of $BaCl_2$ (0.5 mole), 11.33 gr of zirconium oxychloride, and 8.77 gr of cupric chloride. To this mixture, 495 ml of aqueous NaOH (9.0 moles) was added at room temperature, whereupon a highly alkaline slurry containing a brown precipitate resulted. To this slurry, 114 gr of an aqueous solution containing 13.9 gr of sodium ligninsulfonate (agent A) wa added. Following stirring for 10 minutes, the resulting mixture was transferred into an autoclave in which it was heated at 280° C. for 60 minutes. The reaction product was thoroughly washed to remove any impurities and subsequently dried and disintegrated to produce a Ba-ferrite powder.

The powder consisted of fine tabular ferrite grains (size $\leq 0.5$ μm, tabularity ratio $\leq 10$) which were sufficiently discrete to provide good dispersibility. The powder had a saturation magnetization of 54.2 emu/g and a coercive force of 760 Oe.

EXAMPLES 2 to 14

Thirteen Ba-ferrite powder samples were prepared as in Example 1 except that the values of M, M' and x in the formula $MO.n(Fe_{2-x}M'_xO_3)$, as well as the types and amounts of agents A, B and C, and the reaction time and temperature in the autoclave were changed as shown in Table 1.

All the samples of magnetoplumbitic ferrite powder thus obtained consisted of highly discrete and dispersible grains (size $\leq 0.3$ μm, tabularity ratio $\leq 10$). The saturation magnetization, coercive force and specific surface area of each sample are shown in Table 1, from which one can see that all the samples prepared according to the present invention had saturation magnetization values of 50 emu/g or higher and coercive force values between 200 and 2,000 Oe.

TABLE 1

| Ex. No. | Composition $MO.n(Fe_{2-x}M'_xO_3)$ Aqueous 3.1 M $FeCl_2$ (ml) | Aqueous 0.5 M $BaCl_2$ or $SrCl_2$ (ml) | Coercive force controlling agent Fe substituting metals (M') and their molar ratio | Substitution (x) | Alkali modifier Aqueous 9.0 M NaOH (ml) | Reaction accelerator Agent A and its amount (g) | Agent B or C and its amount (g) | Hydrothermal synthesis Autoclaving temp. (°C.) × time (hr.) | Saturation magnetization (emu/g) | Coercive force (Oe) | Specific surface area (m²/g) |
|---|---|---|---|---|---|---|---|---|---|---|---|
| 2 | 280 | $BaCl_2$ 162 | Zr:Cu = 0.1:0.1 | 0.2 | 495 | sodium dodecylbenzenesulfonat = 13.9 | dextrin = 1.86 | 280° C. × 1 hr | 50.3 | 510 | 34.1 |
| 3 | 280 | $BaCl_2$ 162 | Zr:Co = 0.1:0.1 | 0.2 | 495 | sodium dodecylsulfate = 13.9 | diethylene glycol = 3.68 | 280° C. × 1 hr | 51.1 | 370 | 28.0 |
| 4 | 280 | $SrCl_2$ 162 | Ti:Co = 0.1:0.1 | 0.2 | 495 | laurylamine acetate = 18.5 | diose = 7.36 sodium hexametaphosphate = 0.19 | 220° C. × 4 hr | 51.5 | 690 | 31.3 |
| 5 | 280 | $BaCl_2$ 162 | Zr:Cu = 0.08:0.12 | 0.2 | 495 | oleic acid = 13.9 | | 280° C. × 1 hr | 50.5 | 630 | 25.3 |
| 6 | 280 | $BaCl_2$ 162 | Ti:Cu = 0.1:0.1 | 0.2 | 495 | sorbitan monooleate = 13.9 | β-methyl glycoside = 4.60 | 200° C. × 6 hr | 52.6 | 615 | 38.5 |
| 7 | 280 | $SrCl_2$ 162 | Zr:CO = 0.1:0.1 | 0.2 | 495 | tallowdiamine = 4.7 | methyl alcohol = 3.68 | 220° C. × 4 hr | 52.5 | 500 | 26.2 |
| 8 | 280 | $BaCl_2$ 162 | Zr:Cu = 0.1:0.1 | 0.2 | 495 | formalin sodium β-naphthalenesulfonate = 13.9 | colloidal silica = 0.28 | 280° C. × 1 hr | 50.9 | 770 | 27.0 |
| 9 | 280 | $SrCl_2$ 162 | Zr:Cu = 0.08:0.2 | 0.2 | 495 | stearyl trimethylammonium chloride = 23.2 | ascorbic acid = 2.80 | 280° C. × 1 hr | 50.1 | 960 | 33.8 |
| 10 | 280 | $BaCl_2$ | Ti:Cu = | 0.2 | 495 | sodium | sodium ci- | 250° C. × 2 hr | 51.9 | 980 | 35.0 |

TABLE 1-continued

| | Composition MO.n(Fe$_{2-x}$M'hc $_x$O$_3$) | | | | Alkali modifier | | | | Produced ferrite powder | | |
|---|---|---|---|---|---|---|---|---|---|---|---|
| | Aqueous | Coercive force controlling agent | | | | Reaction accelerator | | Hydrothermal synthesis | Saturation magnetization (emu/g) | Coercive force (Oe) | Specific surface area (m$^2$/g) |
| Ex. No. | Aqueous 3.1 M FeCl$_2$ (ml) | 0.5 M BaCl$_2$ or SrCl$_2$ (ml) | Fe substituting metals (M') and their molar ratio | Substitution (x) | Aqueous 9.0 M NaOH (ml) | Agent A and its amount (g) | Agent B or C and its amount (g) | Autoclaving temp. (°C.) × time (hr.) | | | |
| | | 162 | 0.08:0.12 | | | tricarballylate = 13.9 | trate = 2.80 sodium aluminate = 0.92 | | | | |
| 11 | 280 | BaCl$_2$ 162 | Zr:Zn = 0.1:0.1 | 0.2 | 495 | tallowdiamine | — | 280° C. × 1 hr | 53.9 | 715 | 22.0 |
| 12 | 280 | BaCl$_2$ 162 | Zr:Ni = 0.1:0.1 | 0.2 | 495 | tallowdiamine | — | 280° C. × 1 hr | 50.1 | 720 | 35.1 |
| 13 | 280 | BaCl$_2$ 162 | Zr:Mn = 0.1:0.1 | 0.2 | 495 | tallowdiamine | — | 280° C. × 1 hr | 57.8 | 805 | 23.2 |
| 14 | 280 | BaCl$_2$ 162 | Zr:Cu = 0.2:0.2 | 0.4 | 495 | ligninsulfonic acid = 13.9 | ascorbic acid = 1.86 | 280° C. × 1 hr | 56.5 | 660 | 31.8 |

EXAMPLE 15

A Ba-ferrite powder having the formula BaO.5.7-(Fe$_{1.82}$Zr$_{0.09}$Cu$_{0.09}$O$_3$), wherein M, M', n and x in formula (1) MO.n(Fe$_{2-x}$M'$_x$O$_3$) were respectively Ba, Zr+Cu (in equal amounts), 5.7 and 0.18, was prepared in this Example by the following procedure. First, an intimate mixture was prepared from 688 gr of a slurry containing 85.22 g of iron oxyhydroxide (FeOOH), 162 ml of aqueous BaCl$_2$ (0.5 mole), 11.33 gr of zirconium oxychloride and 8.77 gr of cupric chloride. To this mixture, 495 ml of aqueous NaOH (9.0 moles) was added.

Subsequently, 117 gr of an aqueous solution containing 6.95 gr of sodium laurate was added to the alkaline slurry. After stirring the mixture for 10 minutes, it was transferred into an autoclave where it was heated at 250° C. for 60 minutes. The reaction product was washed with water, dried and heated in an electric furnace in the air at 300° C. for 30 minutes so as to desorb the lauric acid film. The so obtained magnetoplumbitic Ba-ferrite powder had a coercive force of 650 Oe and a saturation magnetization of 52.1 emu/g; it consisted of fine ferrite grains which were highly discrete and dispersible and had a very thin tabular form (specific surface area 32.1 m$^2$/g, size ≦0.3 μm, tabularity ratio ≦10).

EXAMPLE 16

An intimate mixture was prepared from 280 ml of aqueous FeCl$_3$ (3.1 moles), 188 ml of SrCl$_2$ (0.51 mole), 11.33 gr of zirconium oxychloride and 8.66 gr of magnesium chloride. To this mixture, 495 ml of aqueous NaOH (8.9 moles) was added at room temperature, whereupon a highly alkaline slurry containing a brown precipitate resulted. Subsequently, the slurry was heated in an autoclave at 240° C. for 10 minutes. Thereafter, 114 gr of an aqueous solution containing 13.9 gr of sodium dodecylbenzenesulfonate as an agent to accelerate ferrite formation was pumped into the autoclave, which was held at 240° C. for another 60 minutes.

The reaction product was thoroughly washed to remove any impurities, and subsequently dried and disintegrated to obtain a Sr-ferrite powder. This powder consisted of highly discrete and dispersible tabular grains (size ≦0.5 μm, tabularity ratio ≦10). The powder had a saturation magnetization of 57.6 emu/g and a coercive force of 700 Oe.

COMPARATIVE EXAMPLE 1

An intimate mixture was prepared from 280 ml of aqueous FeCl$_3$ (3.1 moles), 162 ml of BaCl$_2$ (0.5 mole), 11.33 gr of zirconium oxychloride and 8.77 gr of cupric chloride. To this mixture, 495 ml of aqueous NaOH (9.0 moles) was added at room temperature, whereupon a highly alkaline slurry containing a brown precipitate resulted. Subsequently, the slurry was held in an autoclave at 280° C. for 60 minutes. The reaction product was thoroughly washed to remove any impurities, and subsequently dried and disintegrated to produce a Ba-ferrite powder.

This powder consisted of fine tabular grains (specific surface area 31 m$^2$/g, size ≧0.3 μm, tabularity ratio ≦10). However, the saturation magnetization and coercive force of the powder were 40.1 emu/g and 890 Oe, respectively.

COMPARATIVE EXAMPLE 2

An intimate mixture of 280 ml of aqueous FeCl$_3$ (3.1 moles) and 162 ml of BaCl$_2$ (0.5 mole) was prepared. To this mixture, 495 ml of aqueous NaOH (9.0 moles) was added at room temperature, whereupon a highly alkaline slurry containing a brown precipitate resulted. This slurry was transferred into an autoclave where it was held at 300° C. for 60 minutes. The reaction product was washed thoroughly to remove any impurities, and subsequently dried and disintegrated to obtain a Ba-ferrite powder.

This powder consisted of grains with an average size of 0.8 μm; some of the grains were sintered and the powder contained coarse grains. The saturation magnetization and coercive force of the powder were 32 emu/g and 1,220 Oe, respectively.

COMPARATIVE EXAMPLE 3

An intimate mixture was prepared from 280 ml of aqueous FeCl$_3$ (3.1 moles), 162 ml of BaCl$_2$ (0.5 mole), 11.33 gr of zirconium oxychloride and 8.77 gr of cupric chloride. To this mixture, 495 ml of aqueous NaOH (9.0 moles) was added at room temperature, whereupon a highly alkaline slurry containing a brown precipitate resulted. To this slurry, 114 gr of an aqueous solution containing 13.9 gr of gelatin was added. Following stirring for 10 minutes, the mixture was transferred into an autoclave where it was held at 280° C. for 60 minutes. The reaction product was thoroughly washed to remove any impurities, and subsequently dried and disintegrated to obtain magnetoplumbitic Ba-ferrite powder.

This powder comprised coarse grains (specific surface area 5.3 m²/g and size ≧ 1 μm) and had a saturation magnetization of 34.1 emu/g.

COMPARATIVE EXAMPLE 4

An intimate mixture was prepared from 280 ml of aqueous FeCl₃ (3.1 moles), 162 ml of BaCl₂ (0.5 mole), 11.33 gr of zirconium oxychloride and 8.77 gr of cupric chloride. To this mixture, 495 ml of aqueous NaOH (9.0 moles) was added at room temperature, whereupon a highly alkaline slurry containing a brown precipitate was formed. To this slurry, 13.9 gr of aminopropyltrimethoxysilane was added, and following stirring for 10 minutes, the mixture was heated in an autoclave at 280° C. for 60 minutes. The resulting reaction product was washed thoroughly to remove any impurities, and subsequently dried and disintegrated to obtain a Ba-ferrite powder.

The product showed no diffraction lines for BaO.6-Fe₂O₃ in X-ray analysis and had a very low saturation magnetization (1.6 emu/g).

COMPARATIVE EXAMPLE 5

An intimate mixture was prepared from 280 ml of aqueous FeCl₃ (3.1 moles), 162 ml of BaCl₂ (0.5 mole), 11.33 gr of zirconium oxychloride and 8.77 gr of cupric chloride. To this mixture, 495 ml of aqueous NaOH (9.0 moles) was added at room temperature, whereupon a highly alkaline slurry containing a brown precipitate resulted. To this slurry, 114 gr of an aqueous solution containing 13.9 gr of sodium citrate was added, and following stirring for 10 minutes, the mixture was transferred into an autoclave where it was heated at 280° C. for 60 minutes. The reaction product was thoroughly washed to remove any impurities, and subsequently dried and disintegrated to provide a Ba-ferrite powder.

Upon X-ray diffractometry, the principal component of the reaction product was found to be α-Fe₂O₃.

What is claimed is:

1. A process for producing a magnetoplumbitic ferrite of the formula:

$$MO.n(Fe_{2-x}M'_xO_3) \quad (1)$$

wherein M is one or more metals selected from the group consisting of Ba, Sr, Ca and Pb; n is a number of 3 to 6; M' is at least one component selected from the group consisting of Si, Ta, Sb, Nb, Zr and Ti, or a combination of that component with at least one other component selected from the group consisting of Ni, Co, Cu, Mg, Mn and Zn; x is a number from 0.01 to 0.7; having a saturation magnetization of not less than 50 emu/g and a coercivity in the range of 200–2000 Oe;

by a hydrothermal reaction, comprising the steps of:
preparing a uniform mixture of the metallic components that provide the ferrite of the formula (1), said mixture being in the form of an aqueous solution containing metal ions, an aqueous slurry containing metal hydroxides, or an aqueous slurry containing both metal ions and metal hydroxides, from the salt of the metallic components that is selected from the group consisting of halides, nitrates and hydroxides;
bringing said mixture into contact with an alkali in the form of an aqueous solution containing an alkali substance and form thereform an alkaline slurry containing precipitated solid particles, wherein the alkali is used in such an amount that the ratio of the equivalent weight of alkali to that of an acid residue contained in the slurry is greater than 1.0 or when an acid residue is absent in the slurry, the alkali is used in such an amount that the alkaline slurry has a pH of 11.0 or more;
placing the resulting slurry in an autoclave and reacting the slurry components to form a ferrite composition, at a temperature higher than 100° C. but not exceeding 400° C., in the presence of 1–70 weight percent, based on the amount of the ferrite composition produced, of at least one organic compound selected from the group consisting of sodium lignosulfonate, sodium dodecylbenzenesulfonate, sodium dodecylsulfonate, laurylamine acetate, oleic acid, sorbitan monooleate, tallowdiamine, formalin sodium benthanaphthalene sulfonate, steary trimethylammonium chloride, sodium tricarballylate, and ligninsulfonic acid;
removing the resulting reaction mixture from the autoclave;
washing the ferrite composition to remove any impurities; and subsequently,
drying and disintegrating to produce the magnetoplumbitic ferrite of the formula (1).

2. The process of claim 1 wherein the ferrite composition is produced at a temperature of 180° C. to 400° C.

3. A process for producing a magnetoplumbitic ferrite of the formula:

$$MO.n(Fe_{2-x}M'_xO_3) \quad (1)$$

wherein M is one or more metals selected from the group consisting of Ba, Sr, Ca and Pb; n is a number of 3 to 6; M' is at least one component selected from the group consisting of Si, Ta, Sb, Nb, Zr and Ti, or a combination of that component with at least one other component selected from the group consisting of Ni, Co, Cu, Mg, Mn and Zn; x is a number from 0.01 to 0.7; having a saturation magnetization of not less than 50 emu/g and a coercivity in the range of 200–2000 Oe;

by a hydrothermal reaction, comprising the steps of:
preparing a uniform mixture of the metallic components that provide the ferrite of the formula (1), said mixture being in the form of an aqueous solution containing metal ions, an aqueous slurry containing metal hydroxide or an aqueous slurry containing both metal ions and metal hydroxides, from the salt of the metallic components that is selected from the group consisting of halides, nitrates and hydroxides;
bringing said mixture into contact with an alkali in the form of an aqueous solution containing an alkali substance and form thereform an alkaline slurry containing precipitated solid particles, wherein the alkali is used in such an amount that the ratio of the equivalent weight of alkali to that of an acid residue contained in the slurry is greater than 1.0 or when an acid residue is absent in the slurry, the alkali is used in such an amount that the alkaline slurry has a pH of 11.0 or more;
placing the resulting slurry in an autoclave and reacting the slurry components to form a ferrite composition, at a temperature higher than 100° C. but not exceeding 400° C., in the presence of 1–70 weight percent, based on the amount of the ferrite composition produced, of at least one organic compound selected from the group consisting of sodium lignosulfonate, sodium dodecylbenzenesulfonate, sodium dodecylsulfonate, laurylamine acetate, oleic acid, sorbitan monooleate, tallowdiamine, formalin sodium bethanaphthalene sulfonate, steary trimethylammonium chloride, sodium tricarballylate, and ligninsulfonic acid; and 0.01 to 10 weight percent, based on the amount of the ferrite composition produced, of at least one additional compound selected from the group consisting of dextrin, diethyleneglycol, diose, betha-methyl alcohol, ascorbic acid, and sodium citrate;

removing the resulting reaction mixture from the autoclave;

washing the ferrite composition to remove any impurities; and subsequently, drying and disintegrating to produce the magnetoplumbitic ferrite of the formula (1).

4. The process of claim 3 wherein the ferrite composition is produced at a temperature of 180° C. to 400° C.

5. A process for producing a magnetoplumbitic ferrite of the formula:

$$MO \cdot n(Fe_{2-x}M'_xO_3) \quad (1)$$

wherein M is one or more metals selected from the group consisting of Ba, Sr, Ca and Pb; n is a number of 3 to 6; M' is at least one component selected from the group consisting of Si, Ta, Sb, Nb, Zr and Ti, or a combination of that component with at least one other component selected from the group consisting of Ni, Co, Cu, Mg, Mn and Zn; x is a number from 0.01 to 0.7; having a saturation magnetization of not less than 50 emu/g and a coercivity soercivity in the range of 200–2000 Oe;

by a hydrothermal reaction, comprising the steps of:

preparing a uniform mixture of the metallic components that provide the ferrite of the formula (1), said mixture being in the form of an aqueous solution containing metal ions, an aqueous slurry containing metal hydroxide or an aqueous slurry containing both metal ions and metal hydroxides, from the salt of the metallic components that is selected from the group consisting of halides, nitrates and hydroxides;

bringing said mixture into contact with an alkali in the form of an aqueous solution containing an alkali substance and form therefrom an alkaline slurry containing precipitated solid particles, wherein the alkali is used in such an amount that the ratio of the equivalent weight of alkali to that of an acid residue contained in the slurry is greater than 1.0 or when an acid residue is absent in the slurry, the alkali is used in such an amount that the alkaline slurry has a pH of 11.0 or more;

placing the resulting slurry in an autoclave and reacting the slury components to form a ferrite composition, at a temperature higher than 100° C. but not exceeding 400° C., in the presence of 1–70 weight percent, based on the amount of the ferrite composition produced, of at least one organic compound selected from the group consisting of sodium lignosulfonate, sodium dodecylbenzenesulfonate, sodium dodecylsulfonate, laurylamine acetate, oleic acid, sorbitan monooleate, tallowdiamine, formalin sodium bethanaphthalene sulfonate, steary trimethylammonium chloride, sodium tricarballylate, and ligninsulfonic acid; and 0.01–5 weight percent, based on the amount of the ferrite composition produced, of at least one additional compound selected from the group consisting of sodium hexamethaphosphate, colloidal silica and sodium aluminate;

removing the resulting reaction mixture from the autoclave;

washing the ferrite composition to remove any impurities; and subsequently, drying and disintegrating to produce the magnetoplumbitic ferrite of the formula (1).

6. The process of claim 5 wherein the ferrite composition is produced at a temperature of 180° C. to 400° C.

7. A process for producing a magnetoplumbitic ferrite of the formula:

$$MO \cdot n(Fe_{2-x}M'_xO_3) \quad (1)$$

wherein M is one or more metals selected from the group consisting of Ba, Sr, Ca and Pb; n is a number of 3 to 6; M' is at least one component selected from the group consisting of Si, Ta, Sb, Nb, Zr and Ti, or a combination of that component with at least one other component selected from the group consisting of Ni, Co, Cu, Mg, Mg, Mn and Zn; x is a number from 0.01 to 0.7; having a saturation magnetization of not less than 50 emu/g and a coercivity in the range of 200–2000 Oe;

by a hydrothermal reaction, comprising the steps of:

preparing a uniform mixture of the metallic components that provide the ferrite of the formula (1), said mixture being in the form of an aqueous solution containing metal ions, an aqueous slurry containing metal hydroxides or an aqueous slurry containing both metal ions and metal hydroxides, from the salt of the metallic components that is selected from the group consisting of halides, nitrates and hydroxides;

bringing said mixture into contact with an alkali in the form of an aqueous solution containing an alkali substance and form therefrom an alkaline slurry containing precipitate solid particles, wherein the alkali is used in such an amount that the ratio of the equivalent weight of alkali to that of an acid residue contained in the slurry is greater than 1.0 or when an acid residue is absent in the slurry, the alkali is used in such an amount that the alkaline slurry has a pH of 11.0 or more;

placing the resulting slurry in an autoclave and reacting the slurry components to form a ferrite composition, at a temperature higher than 100° C. but not exceeding 400° C., in the presence of 1–70 weight percent, based on the amount of the ferrite composition produced, of at least one organic compound selected from the group consisting of sodium lignosulfonate, sodium dodecylbenzenesulfonate, sodium dodecylsulfonate, laurylamine acetate, oleic acid, sorbitan monooleate, tallowdiamine, formalin sodium bethanaphthalene sulfonate, steary trimethylammonium chloride, sodium tricarballylate, and ligninsulfonic acid;

0.01–10 weight percent, based on the amount of the ferrite composition produced, of at least one compound (agent B) selected from the group consisting of dextrin, diethyleneglycol, diose, betha-methyl alcohol, ascorbic acid, and sodium citrate; and 0.01–5 weight percent, based on the amount of the ferrite composition produced, of at least one compound selected from the group consisting of sodium hexamethaphosphate, colloidal silica and sodium aluminate;

removing the resulting reaction mixture from the autoclave;

washing the ferrite composition to remove any impurities; and subsequently, drying and disintegrating to produce the magnetoplumbitic ferrite of the formula (1).

8. The process of claim 7 wherein the ferrite composition is produced at temperature of 180° C. to 400° C.

* * * * *